US005780576A

United States Patent [19]

Weber et al.

[11] Patent Number: 5,780,576
[45] Date of Patent: Jul. 14, 1998

[54] THERMOPLASTIC MOLDING MATERIALS BASED ON PARTLY AROMATIC POLY-AMIDES AND POLYETHERIMIDES

[75] Inventors: Martin Weber, Neustadt; Herbert Fisch, Wachenheim; Gunter Pipper, Bad Dürkheim; Axel Gottschalk, Neustadt, all of Germany

[73] Assignee: BASF Aktiengesellschaft, Ludwigshafen, Germany

[21] Appl. No.: 631,096

[22] Filed: Apr. 12, 1996

[30] Foreign Application Priority Data

Apr. 12, 1995 [DE] Germany ............... 195 13 848.1

[51] Int. Cl.$^6$ .................. C08G 69/08; C08G 73/10; C08L 77/06
[52] U.S. Cl. ............. 528/310; 528/322; 528/329.1; 528/332; 528/335; 528/340; 525/431; 525/432; 525/436; 428/395; 428/396; 428/474.5
[58] Field of Search .................. 525/432, 436; 575/431; 528/310, 322, 335, 332, 329.1, 340; 428/395, 396

[56] References Cited

U.S. PATENT DOCUMENTS

| 4,906,730 | 3/1990 | Takekoshi et al. | 528/353 |
| 5,013,799 | 5/1991 | Giles, Jr. et al. | 525/432 |
| 5,166,246 | 11/1992 | Gallucci et al. | 524/341 |
| 5,326,850 | 7/1994 | Goetz et al. | 528/310 |
| 5,330,820 | 7/1994 | Li et al. | 428/113 |
| 5,527,844 | 6/1996 | Weber et al. | 524/237 |

FOREIGN PATENT DOCUMENTS

| 104 659 | 4/1984 | European Pat. Off. |
| 345 486 | 12/1989 | European Pat. Off. |
| 510 383 | 10/1992 | European Pat. Off. |
| WO89/10948 | 11/1989 | WIPO |

Primary Examiner—P. Hampton-Hightower
Attorney, Agent, or Firm—Keil & Weinkauf

[57] ABSTRACT

Thermoplastic molding materials contain

A) from 1 to 99% by weight of a partly aromatic copolyamide composed of
   $a_1$) from 30 to 44 mol % of units which are derived from terephthalic acid,
   $a_2$) from 6 to 25 mol % of units which are derived from isophthalic acid,
   $a_3$) from 43 to 49.5 mol % of units which are derived from hexamethylenediamine and
   $a_4$) from 0.5 to 7 mol % of units which are derived from aliphatic cyclic diamines of 6 to 30 carbon atoms.

the molar percentages of components $a_1$) to $a_4$) together giving 100%.

B) from 1 to 99% by weight of a polyetherimide.

C) from 0 to 30% by weight of a polymeric component having OH groups.

D) from 0 to 60% by weight of fibrous or particulate fillers or mixtures thereof, E) from 0 to 40% by weight of rubber impact modifiers and F) from 0 to 40% by weight of conventional additives and processing assistants.

7 Claims, No Drawings

THERMOPLASTIC MOLDING MATERIALS BASED ON PARTLY AROMATIC POLYAMIDES AND POLYETHERIMIDES

BACKGROUND OF THE INVENTION

1. Field of the Invention

The present invention relates to thermoplastic molding materials containing

A) from 1 to 99% by weight of a partly aromatic copolyamide composed of

- $a_1$) from 30 to 44 mol % of units which are derived from terephthalic acid,
- $a_2$) from 6 to 25 mol % of units which are derived from isophthalic acid,
- $a_3$) from 43 to 49.5 mol % of units which are derived from hexamethylenediamine and
- $a_4$) from 0.5 to 7 mol % of units which are derived from aliphatic cyclic diamines of 6 to 30 carbon atoms, the molar percentages of components $a_1$) to $a_4$) together giving 100%, B) from 1 to 99% by weight of a polyetherimide, C) from 0 to 30% by weight of a polymeric component having OH groups, D) from 0 to 60% by weight of fibrous or particulate fillers or mixtures thereof, E) from 0 to 40% by weight of rubber impact modifiers and F) from 0 to 40% by weight of conventional additives and processing assistants.

The present invention furthermore relates to the use of such thermoplastic molding materials for the production of fibers, films and moldings, and to the fibers, films and moldings themselves which are obtainable thereby.

2. Description of Related Art

Polymer blends comprising polyamides and polyetherimides are described in a number of publications.

Blends based on polyetherimides and partly aromatic polyamides are known per se. For example, blends which comprise polyetherimides and crystalline polyamides and have a high resistance to chemicals are disclosed in EP-A-104 659. U.S. Pat. No. 5 013 799 states that polyetherimides and polyamides in certain ratios give blends having improved heat distortion resistance and impact strength. WO 89/10948 discloses blends of polyetherimides, partly aromatic polyamides and aliphatic polyamides as compatibilizers for use as cable insulation.

For many applications, materials which have very good rigidities and strengths even at above 100° C. are required. However, it is precisely at elevated temperatures that the known polyetherimide/polyamide blends do not satisfactorily meet these requirements.

SUMMARY OF THE INVENTION

It is an object of the present invention to provide blends which are based on polyetherimides and partly aromatic polyamides and have a balanced property spectrum, in particular good rigidities and strengths, at 100° C. or higher.

We have found that this object is achieved, according to the invention, by the thermoplastic molding materials as defined as follows.

DESCRIPTION OF PREFERRED EMBODIMENTS

Component A

The novel molding materials contain, as component A, from 1 to 99, preferably from 5 to 93, and in particular from 10 to 77%, by weight of a partly aromatic polyamide, ie. of a polyamide which is composed partly of monomers which contain an aromatic ring.

According to the invention, the partly aromatic copolyamides are composed of

- $a_1$) from 30 to 44, preferably from 32 to 40, and in particular from 32 to 38, mol % of units which are derived from terephthalic acid,
- $a_2$) from 6 to 25, preferably from 10 to 21, and in particular from 12 to 18, mol % of units which are derived from isophthalic acid,
- $a_3$) from 43 to 49.5, preferably from 46 to 48.5, in particular from 46.3 to 48.2, mol % of units which are derived from hexamethylenediamine, and
- $a_4$) from 0.5 to 7, preferably from 1.5 to 4, and in particular from 1.8 to 3.7, mol % of units which are derived from aliphatic cyclic diamines of 6 to 30, preferably 13 to 29, and in particular 13 to 17, carbon atoms, the molar percentages of components $a_1$) to $a_4$) together giving 100%.

The diamine units $a_3$) and $a_4$) are preferably reacted in roughly equimolar amounts with the dicarboxylic acid units $a_1$) and $a_2$).

Suitable monomers $a_4$) are preferably cyclic diamines of the formula I

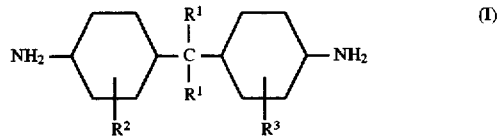

where $R^1$ is hydrogen or $C_1$–$C_4$-alkyl and $R^2$ and $R^3$ are each $C_1$–$C_4$-alkyl or hydrogen.

Particularly preferred diamines $a_4$) are bis(4-aminocyclohexyl)-methane, bis(4-amino-3-methylcyclohexyl)methane, 2,2-bis(4-amino-cyclohexyl)propane and 2,2-bis(4-amino-3-methylcyclohexyl)propane.

Examples of further monomers $a_4$) are 1,3- and 1,4-cyclohexane-diamine and isophoronediamine.

In addition to the units $a_1$) to $a_4$) described above, the partly aromatic copolyamides may contain up to 20, preferably up to 10, and in particular up to 4%, by weight of further polyamide-forming monomers as), as known from other polyamides.

Aromatic dicarboxylic acids as component as) generally have 8 to 16 carbon atoms. Suitable aromatic dicarboxylic acids are, for example, substituted terephthalic and isophthalic acids, such as 3-tert-butylisophthalic acid, and polynuclear dicarboxylic acids, eg. 4,4'- or 3,3'-biphenyldicarboxylic acid, 4,4'- or 3,3'-diphenylmethanedicarboxylic acid, 4,4'- or 3,3'-dicarboxydiphenyl sulfone, 1,4- or 2,6-naphthalenedicarboxylic acid and phenoxyterephthalic acid.

Further polyamide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. As suitable monomers of these types, suberic acid, azelaic acid and sebacic acid are mentioned here merely as typical aliphatic dicarboxylic acids, 1,4-butanediamine, 1,5-pentanediamine and piperazine as typical diamines, and caprolactam, capryllactam, enantholactam, ω-amino-undecanoic acid and laurolactam as typical lactams and amino-carboxylic acids.

Furthermore, partly aromatic copolyamides which have proven particularly advantageous are those whose triamine content is less than 0.5, preferably less than 0.3%, by weight.

Partly aromatic copolyamides prepared by most known processes (cf. U.S. Pat. No. 4 603 166) have triamine contents of more than 0.5% by weight, which leads to a deterioration in the product quality and to problems during continuous preparation. A particular example of a triamine which gives rise to these problems is dihexamethylenetriamine, which is formed from the hexamethylenediamine used in the preparation.

Partly aromatic copolyamides having a low triamine content have, at the same solution viscosity, lower melt viscosities compared with products of the same composition which have a higher triamine content. This considerably improves both the processibility and the product properties.

The melting points of the last-mentioned partly aromatic copolyamides are in general from 290° to 340° C., preferably from 295° to 330° C., this melting point being associated with a high glass transition temperature of, as a rule, more than 120° C., in particular more than 130° C. (in the dry state).

The partly aromatic copolyamides preferably have a crystallinity of >30%, preferably >35%, and in particular >40%.

The crystallinity is a measure of the proportion of crystalline fragments in the copolyamide and is determined by X-ray diffraction or indirectly by measuring $\Delta H_{cryst}$ Mixtures of different partly aromatic copolyamides can of course also be used, any desired mixing ratio being possible.

Suitable processes for the preparation of partly aromatic copolyamides which can be used according to the invention are known to a person skilled in the art.

An example of a preferred procedure is the batch process. Here, the aqueous monomer solution is heated to 280°–340° C. in an auto-clave in the course of from 0.5 to 3 hours, the resulting pressure of from 10 to 50, in particular from 15 to 40, bar being kept as constant as possible for up to 2 hours by releasing excess steam. The autoclave is then let down at constant temperature in the course of from 0.5 to 2 hours until a final pressure of from 1 to 5 bar has been reached. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, as), having a monomer content of from 30 to 70, preferably from 40 to 65%, by weight, is heated to 280°–330° C. under superatmospheric pressure (1 to 10 bar) in the course of less than 60 seconds with simultaneous evaporation of water and formation of a prepolymer, prepolymer and steam are then continuously separated, the steam is rectified and the entrained diamines are recycled. Finally, the prepolymer is passed into a polycondensation zone and subjected to polycondensation under superatmospheric pressure of from 1 to 10 bar and at from 280° to 330° C. in a residence time of from 5 to 30 minutes. Of course, the temperature in the reactor is above the melting point of the resulting prepolymer at the respective steam pressure.

These short residence times substantially prevent the formation of triamines.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the resulting polyamide prepolymer is passed in molten form through a discharge zone with simultaneous removal of the residual water contained in the melt. Suitable discharge zones are, for example, devolatilization extruders. The melt thus freed from water is then extruded and granulated.

These granules are subjected to continuous or batchwise solid-phase condensation under an inert gas at below the melting point, for example from 170° to 240° C., until the desired viscosity is obtained. For example, tumbling dryers can be used for the batch-wise solid-phase condensation, and heating tubes through which hot inert gas flows can be used for the continuous solid-phase condensation. The continuous solid-phase condensation is preferred, the inert gas used being nitrogen or, in particular, superheated steam, advantageously the steam obtained at the top of the column.

The viscosity number after the solid-phase postcondensation or the other abovementioned preparation processes is in general from 100 to 500, preferably from 110 to 200, ml/g, measured in 0.5% strength by weight solution in 96% strength sulfuric acid at 25° C.

Component B

The novel molding materials contain, as component B, from 1 to 99, preferably from 5 to 93%, by weight of polyetherimides. Particularly preferred molding materials contain from 10 to 77% by weight of this component.

Both aliphatic and aromatic polyetherimides can in principle be used as polyetherimides B. Polyetherimides which contain both aliphatic and aromatic groups in the main chain are also suitable. For example, it is possible to use polyetherimides which contain repeating units of the general formula II

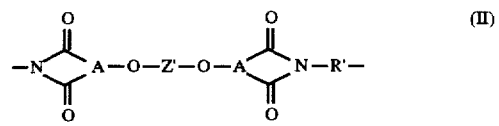

where A is, for example, selected from

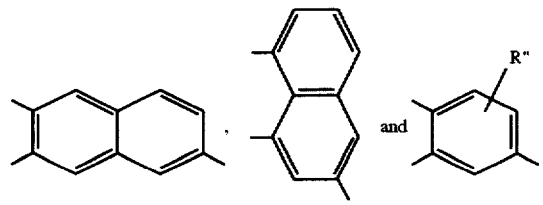

and

Z' and R', independently of one another, may be identical or different. Z and R may be, for example, $C_1$–$C_{30}$-alkylene. The alkylene group may be linear or branched or cyclized. Methylene, ethylene, n-propylene, isopropylene, cyclohexylene and n-decylene may be mentioned here. However, Z' and R' may also be $C_7$–$C_{30}$-alkylarylene. Examples of these are diphenylmethane, diphenylethane and 2,2-diphenylpropane. Furthermore, Z' and R' may be $C_6$–$C_{18}$-arylene, such as phenylene or biphenylene. The abovementioned groups may in turn be substituted by one or more substituents or interrupted by hetero atoms or hetero groups. Particularly preferred substituents are halogen, preferably chlorine or bromine, and $C_1$–$C_{10}$-alkyl, in particular methyl or ethyl. The preferred hetero atoms or hetero groups include —$SO_2$—, —O— and —S—. Some suitable radicals Z' and R' are shown below by way of example:

and R is selected from

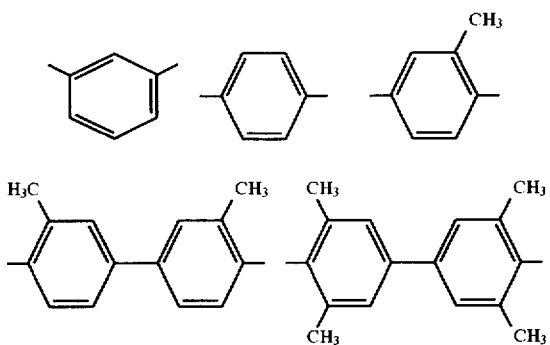

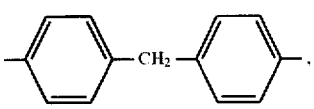

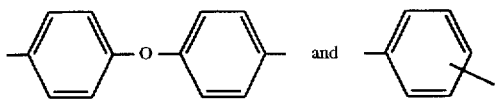

Very particularly preferred polyetherimides contain repeating units of the formula (III₁)

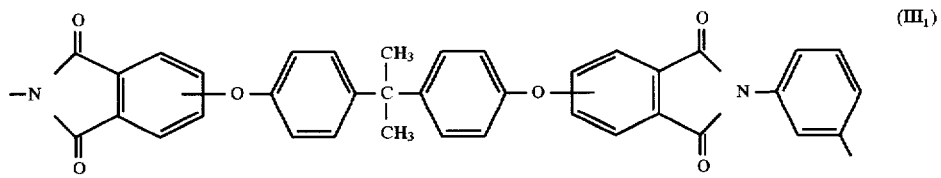

-continued

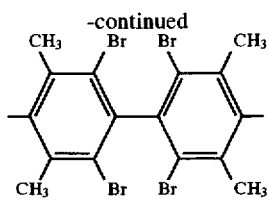

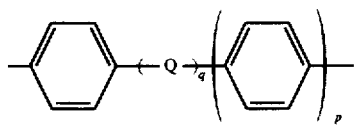

where Q may be —$C_yH_{2y}$—, —CO—, —$SO_2$—, —O— or —S—, q is 0 or 1, p is 0 or 1 and y is an integer from 1 to 5.

R" may be $C_1$-$C_{10}$-alkyl or $C_1$-$C_{10}$-alkoxy. Preferably used polyetherimides are those which contain repeating units of the general formula III

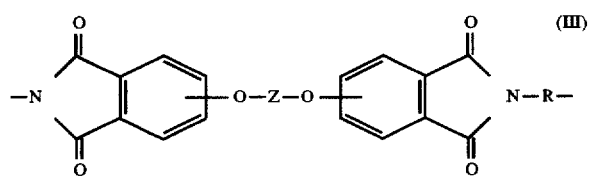

where Z and R have the same meanings as Z' and R'.

Particularly preferred polyetherimides contain repeating units in which Z is

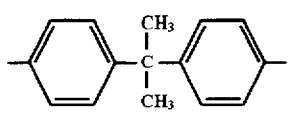

The polyetherimides B have in general number average molecular weights ($M_n$) of from 5000 to 50 000, preferably from 8000 to 40 000. They are either known or are obtainable by known methods.

For example, appropriate dianhydrides can be reacted with appropriate diamines to give the polyetherimides B. As a rule, this reaction is carried out in the absence of a solvent or in an inert solvent at from 100° to 250° C. Particularly suitable solvents are o-dichlorobenzene and m-cresol. The polyetherimides can also be prepared in the melt at from 200° to 400° C., preferably from 230° to 300° C. For the preparation of the polyetherimides, the dianhydrides are generally reacted with the diamines in an equimolar ratio. However, a certain molar excess, for example from 0.1 to 5 mol %, of dianhydride or diamine is possible.

Component C

The novel molding materials contain, as component C, a polymeric component having hydroxyl groups. The amount of component C in the novel molding materials is from 0 to 30% by weight, based on the total weight of components A to F and depends on the compatibility of the partly aromatic copolyamide with the component B. In general, amounts of from 1 to 20, in particular from 3 to 15%, by weight have proven particularly advantageous.

Component C has a compatibilizing effect. This is very probably due to the fact that interactions, for example H bridge bonds, are present between the component C and components A and B and result in better interphase adhesion.

As stated above, all polymers having hydroxyl groups which are essentially freely available are in principle suitable. It is of course necessary to ensure that the components A and B are stable in the presence of component C. This is particularly important where compounds having acidic —OH groups are used.

When these preconditions are taken into account, certain groups of compounds have proven particularly advantageous and are described below. However, it is possible in principle also to use other components C, provided that the stability of the components A and B does not suffer as a result.

The first group of particularly suitable polymers comprises polycondensates of aliphatic or aromatic diols or polyhydric alcohols with epihalohydrins. Such compounds and processes for their preparation are known per se to a person skilled in the art, and further information is therefore superfluous here. Aliphatic or aromatic diols are in principle suitable. Particularly preferred dihydroxy compounds are the diols used for the preparation of polycarbonates.

Owing to the ready availability, a polycondensate of bisphenol A and epichlorohydrin having the structure

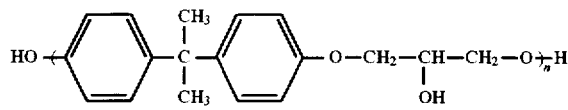

is preferably used.

In addition to the possibility of using polymers which already have the hydroxyl group in the main chain, it is also possible to use polymers or copolymers which acquire these functional groups as a result of the presence of suitable monomers in the polymerization, and the groups may then be present in the polymers likewise in the main chain, but also in substituents of the main chain. A further possibility is the grafting of suitable monomers having OH groups onto grafting bases, grafting bases which are suitable in principle being all polymers which are not completely incompatible with components A and B. A certain degree of incompatibility can be compensated by increasing the amount of hydroxyl groups.

Suitable components C are therefore, for example, polymers based on polyolefins, polystyrene and rubber elastomers which have hydroxyl groups —OH which are obtainable either by using suitable comonomers or by grafting on the functional groups —OH. The amount of comonomers or graft monomers having hydroxyl groups —OH is dependent on the compatibility of the base polymer with the components A and B. The better the compatibility, the smaller may the amount of OH groups be. From the above, it is evident that a large number of polymers are suitable as component C, of which some particularly preferred types are presented in more detail below merely by way of example.

The first group comprises polymers and copolymers containing up to 100 mol % of vinylphenylcarbinols, vinylphenyldimethylcarbinols and in particular vinylphenylhexafluorodimethylcarbinol having proven particularly suitable. Once again, the abovementioned types of polymers are advantageous as base polymer or grafting base.

A second group comprises the polymers and copolymers of this group with vinylphenols which may also contain substituents in the nucleus. Substituents which increase the acidity of the phenolic hydrogen are particularly suitable, for example halogen substituents, but also other electron-attracting substituents.

A third group comprises phenol/formaldehyde polycondensates, provided that they are uncrosslinked and soluble. These products may be linear or branched.

In addition, polymers and copolymers with all polymerizable or graftable alcohols may in principle be mentioned.

It should be mentioned that polymers having hydroxyl groups —OH and based on polyamides or polyglutarimides are particularly preferred since in this case there is from the outset compatibility with at least the component A or B, so that the amount of OH groups can be reduced.

The component C can be prepared by conventional polycondensation or graft polymerization or copolymerization methods, and further information is therefore superfluous here.

Component D

In addition to the components A, B and C, the novel molding materials may also contain reinforcing agents or fillers; the amount of these substances may be up to 60, preferably from 0 to 45, and in particular from 10 to 40%, by weight.

Suitable particulate fillers are amorphous silica, magnesium carbonate (chalk), powdered quartz, mica, talc, feldspar, glass beads and in particular calcium silicates, such as wollastonite and kaolin (in particular calcined kaolin), and carbon black.

Examples of fibrous reinforcing materials are potassium titanate whiskers, aramid fibers and in particular glass fibers. Where glass fibers are used, they may be provided with a size and an adhesion promoter to improve the compatibility of the matrix material.

The glass fibers may be incorporated both in the form of short glass fibers and in the form of rovings. In the finished injection molded part, the average length of the glass fibers is preferably from 0.04 to 0.5 mm.

Preferred combinations of fillers are, for example, from 5 to 30% by weight of wollastonite or talc with from 1 to 10% by weight of glass fibers.

Component E

In addition to the components A to D, the novel molding materials may also contain up to 40, preferably up to 25%, by weight of a rubber impact modifier E.

Preferred elastomeric polymers are polymers based on olefins, which are composed of the following components:

$e_1$) from 40 to 100% by weight of at least one α-olefin of 2 to 8 carbon atoms, $e_2$) from 0 to 50% by weight of a diene, $e_3$) from 0 to 45% by weight of a $C_1$–$C_{12}$-alkyl ester of acrylic acid or methacrylic acid or mixtures of such esters, $e_4$) from 0 to 40% by weight of an ethylenically unsaturated mono- or dicarboxylic acid or a functional derivative of such an acid, $e_5$) from 0 to 40% by weight of an epoxy-containing monomer and $e_6$) from 0 to 5% by weight of other monomers capable of free radical polymerization, with the proviso that the component C is not an olefin homopolymer.

A first preferred group comprises the ethylene/propylene (EPM) and ethylene/propylene/diene (EPDM) rubbers, which preferably have a ratio of ethylene units to propylene units in the range from 40:60 to 90:10.

The Mooney viscosities (MLI+4/100° C.) of such, preferably uncrosslinked, EPM and EPDM rubbers (gel contents in general below 1% by weight) are preferably from 25 to 100, in particular from 35 to 90 (measured using the large rotor after a running time of 4 minutes at 100° C. according to DIN 53 523).

EPM rubbers generally have virtually no double bonds, whereas EPDM rubbers may have from 1 to 20 double bonds per 100 carbon atoms.

Examples of diene monomers $e_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3, 8-decadiene, and mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM and EPDM rubbers may preferably also be grafted with reactive carboxylic acids or derivatives thereof. Particular examples of these are acrylic acid, methacrylic acid and derivatives thereof and maleic anhydride.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

In principle, all primary and secondary $C_1$–$C_{18}$-alkyl esters of acrylic acid or methacrylic acid are suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of methacrylates and acrylates $e_3$ is 0–60, preferably 10–50, and in particular 30–45%, by weight, based on the olefin polymers.

Instead of the esters $e_3$, or in addition to them, ethylenically unsaturated mono- or dicarboxylic acids $e_4$ having acid functional groups and/or latent acid functional groups or epoxy-containing monomers $e_5$ may be present in the olefin polymers.

Examples of monomers $e_4$ are acrylic acid, methacrylic acid, tertiary alkyl esters of these acids, in particular tert-butyl acrylate, and dicarboxylic acids, such as maleic acid and fumaric acid, and derivatives of these acids and monoesters thereof.

Monomers having latent acid functional groups are to be understood as meaning those compounds which form free acid groups under the polymerization conditions or during incorporation of the olefin polymers into the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tert-butyl methacrylate.

The monomers having acid functional groups or latent acid functional groups and the epoxy-containing monomers are preferably incorporated into the olefin polymers by adding to the monomer mixture compounds of the general formulae I–IV

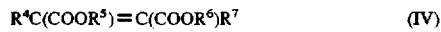   (IV)

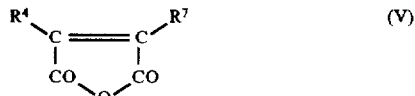   (V)

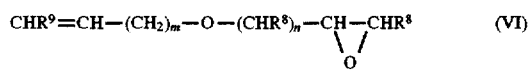   (VI)

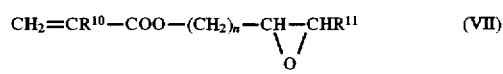   (VII)

where $R^4$–$R^{11}$ are each hydrogen or alkyl with 1 to 6 carbon atoms, m is an integer from 0 to 20 and n is an integer from 0 to 10.

$R^4$–$R^9$ are each preferably hydrogen, m is preferably 0 or 1 and n is preferably 1. The corresponding compounds are maleic acid, fumaric acid and maleic anhydride $e_4$) and alkenyl glycidyl ether and vinyl glycidyl ether $e_5$).

Preferred compounds of the formulae IV, V, VI and VII are maleic acid and maleic anhydride as component $e_4$) and epoxy-containing esters of acrylic acid and/or methacrylic acid, glycidyl acrylate and glycidyl methacrylate being particularly preferred (as component $e_5$)).

The amounts of components $e_4$) and $e_5$) are each from 0.07 to 40, in particular from 0.1 to 20, particularly preferably from 0.15 to 15%, by weight, based on the total weight of the olefin polymers.

Particularly preferred olefin polymers are those comprising from 50 to 98.9, in particular from 60 to 95%, by weight of ethylene, from 0.1 to 20.0, in particular from 0.15 to 15%, by weight of glycidyl acrylate and/or glycidyl methacrylate, acrylic acid and/or maleic anhydride, and from 1 to 45.0, in particular from 10 to 35%, by weight of n-butyl acrylate and/or 2-ethylhexyl acrylate.

Further preferred esters of acrylic and/or methacrylic acid are the methyl, ethyl, propyl and isobutyl esters.

For example, vinyl esters and vinyl ethers are suitable as other monomers $e_6$).

The ethylene copolymers described above can be prepared by methods known per se, preferably by random copolymerization under high pressure and at elevated temperatures.

The melt flow index of the ethylene copolymers is in general from 1 to 80 g/10 min (measured at 190° C. and 2.16 kg load).

In addition to the above preferred elastomeric polymers based on olefins, suitable elastomers E are, for example, emulsion polymers, the preparation of which is described in, for example, Houben-Weyl, Methoden der organischen Chemie, Volume XII.I (1961), and by Blackley in the monograph Emulsion Polymerisation.

In principle, random elastomers or those having a shell morphology may be used. The shell morphology is determined by the order of addition of the individual monomers.

Examples of monomers for the preparation of the elastomers are acrylates, such as n-butyl acrylate and 2-ethylhexyl acrylate, corresponding methacrylates and mixtures thereof. These monomers can be copolymerized with further monomers, such as styrene, acrylonitrile, vinyl ethers and further acrylates or methacrylates, such as methyl methacrylate, methyl acrylate, ethyl acrylate and propyl acrylate.

The use of emulsion polymers which have reactive groups at the surface is advantageous. Such groups are, for example, epoxy, carboxyl, latent carboxyl, amino and amido.

The graft monomers described in EP-A 208 187 are also suitable for introducing reactive groups at the surface.

The emulsion polymers may furthermore be completely or partially crosslinked. Examples of monomers which act as crosslinking agents are buta-1,3-diene, divinylbenzene, diallyl phthalate and dihydrodicyclopentadienyl acrylate and the compounds described in EP-A 50 265.

It is also possible to use graft-linking monomers, ie. monomers having two or more polymerizable double bonds which react at different rates in the polymerization.

Examples of such graft-linking monomers are allyl-containing monomers, in particular allyl esters of ethylenically unsaturated carboxylic acids, such as allyl acrylate, allyl methacrylate, diallyl maleate, diallyl fumarate or diallyl itaconate, or the corresponding monoallyl compounds of these dicarboxylic acids. There is also a large number of further suitable graft-linking monomers; for further details, reference may be made to, for example, U.S. Pat. No. 4,148,846.

In general, the amount of these crosslinking monomers in the component E is up to 5, preferably not more than 3%, by weight, based on E.

Examples of preferred emulsion polymers are n-butyl acrylate/(meth)acrylic acid copolymers, n-butyl acrylate/glycidyl acrylate or n-butyl acrylate/glycidyl methacrylate copolymers and graft polymers having an inner core of n-butyl acrylate and an outer shell of the abovementioned copolymers.

The elastomers E described can also be prepared by other conventional processes, for example by suspension polymerization.

Siloxane-based graft rubbers may also be used.

Suitable siloxane cores can be prepared, for example, starting from cyclic oligomeric octamethyltetrasiloxane or tetravinyl-tetramethyltetrasiloxane. These can be subjected to a ring-opening cationic polymerization reaction, for example with γ-mercapto-propylmethyldimethoxysilane, preferably in the presence of sulfonic acids, to give the soft siloxane cores. The siloxanes may also be crosslinked, for example by carrying out the polymerization reaction in the presence of silanes having hydrolyzable groups, such as halogen or alkoxy groups, eg. tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso) cyanurate. The hard components are derived in general from styrene, α-methylstyrene and copolymers thereof, and acrylonitrile, methacrylonitrile and methyl methacrylate may be mentioned here as preferred comonomers.

A further group of suitable impact modifiers comprises thermoplastic polyester elastomers. Polyester elastomers are understood as meaning segmented copolyether esters which contain long-chain segments which are generally derived from poly(alkylene) ether glycols and short-chain segments which are derived from low molecular weight diols and dicarboxylic acids. Such products are known per se and are described in the literature, for example in U.S. Pat. No. 3 651 014. Corresponding products are also commercially available under the names Hytrel® (Du Pont), Arnitel® (Akzo) and Pelprene® (Toyobo Company Ltd.).

Other suitable impact modifiers are thermoplastic polyurethane elastomers. Their preparation is known to a person skilled in the art.

Mixtures of different rubbers can of course also be used.

Component F

In addition to the essential components A, B and, if required, C, D and E, the novel molding materials may contain conventional additives and processing assistants F. The amount thereof is in general up to 40, preferably from 0 to 15%, by weight, based on the total weight of the components A to F.

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3%, by weight.

The pigments for coloring thermoplastics are generally known, cf., for example, R. Gachter and H. Muller, Taschenbuch der Kunststoffadditive, Carl Hanser Verlag, 1983, pages 494 to 510. A first preferred group of pigments comprises white pigments, such as zinc oxide, zinc sulfide, lead white (2 $PbCO_3.Pb(OH)_2$), lithopone, antimony white and titanium dioxide. Of the two most commonly used crystal modifications (rutile and anatase type) of titanium dioxide, the rutile form in particular is used for making the novel molding materials white.

Black pigments which may be used according to the invention are iron oxide black ($Fe_3O_4$), spinel black (Cu(Cr, Fe)$_2O_4$), manganese black (mixture of manganese dioxide, silica and iron oxide), cobalt black and antimony black and particularly preferably carbon black, which is generally used in the form of furnace black or gas black (in this context, cf. G. Benzing, Pigmente für Anstrichmittel, Expert-Verlag (1988), page 78 et seq.).

According to the invention, it is of course possible to use inorganic color pigments, such as chrome oxide green, or organic color pigments, such as azo pigments and phthalocyanines, for establishing certain hues. Such pigments are generally commercially available.

It may also be advantageous to use the stated pigments or dyes as a mixture, for example carbon black with copper phthalocyanines, since the color dispersion in the thermoplastic is generally facilitated.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. The halides, in particular of copper, may also contain electron-rich π ligands. Examples of such copper complexes are copper halide complexes with, for example, triphenylphosphine. Zinc fluoride and zinc chloride may also be used. Sterically hindered phenols, hydroquinones, substituted members of this group, secondary aromatic amines, if necessary in combination with phosphorus-containing acids or salts thereof, and mixtures of these compounds may furthermore be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which as a rule are added in amounts of up to 1% by weight to the thermoplastic material, are stearic acid, stearyl alcohol, alkyl stearates and stearamides and the esters of pentaerythritol with long-chain fatty acids. Salts of calcium, of zinc or of aluminum with stearic acid and dialkyl ketones, eg. distearyl ketone, may also be used.

The novel thermoplastic molding materials can be prepared by processes known per se, by mixing the starting components in a conventional mixing apparatus, such as an extruder, a Brabender mill or a Banbury mill, or a kneader and then carrying out extrusion. After extrusion, the extrudate is usually cooled and comminuted.

The order in which the components are mixed may be varied; for example, two or, if required, three components may be premixed, but it is also possible to mix all components together.

Thorough mixing is advantageous for obtaining a very homogeneous molding material. In general, average mixing times of from 0.2 to 30 minutes at from 295° to 360° C. (ie. above the melting point of A) are required for this purpose.

The novel molding materials possess high rigidity at above 100° C. and very good mechanical properties. Surprisingly, the novel molding materials also have advantageous shrinkage properties. Moldings, films or fibers can be produced from the novel molding materials. Owing to the stated properties, the novel molding materials are particularly suitable for the production of moldings for the electrical and electronics sector and automotive and apparatus construction.

Examples

Preparation of the components $A_{1-3}$ and $AV_{1-3}$

The preparation of the partly aromatic copolyamides used as component A is described in detail below, and the composition of the products is shown in Table 1. The specific heat of fusion $\Delta H_{cryst}$ was determined by means of differential scanning calorimetry (DSC 9900, from Du Pont) at a heating rate of 20° C./min, as a relative measure of the crystallinity.

Components $A_1$ and $A_3$

A 60% strength aqueous solution comprising terephthalic acid, isophthalic acid, hexamethylenediamine and bis(4-amino-3-methyl-cyclohexyl)methane or bis(4-aminocyclohexyl)methane was conveyed, in the proportions stated in the table, from a heated storage container at about 80° C. at a rate corresponding to 5 kg/hour of polyamide, by means of a metering pump, into a tubular evaporator arranged partly horizontally and partly vertically. The evaporator was heated by means of a liquid heating medium which was at 326° C., with vigorous circulation. The evaporator had a length of 3 m, a capacity of 180 ml and a heat transfer area of about 1300 cm². The residence time in the evaporator was 50 seconds. The prepolymer/steam mixture emerging from the evaporator was at 310° C. and was separated in a separator into steam and melt. The melt remained in the separator for a further 10 minutes and was then extruded by means of a discharge screw having a devolatilization zone, and the extrudate was solidified in a water bath and then granulated. The separator and the evaporator zone were kept at 5 bar by a pressure control means which was arranged downstream of the column. The steam separated off in the separator was fed to a packed column which had about 10 theoretical plates and to which about 1 l/h of vapor condensate was added at the top to generate a reflux. The resulting temperature at the top of the column was 152° C. The steam emerging after the expansion valve was condensed and contained less than 0.05% by weight of hexamethylenediamine. An aqueous solution of hexamethylenediamine, which contained 80% by weight of hexamethylenediamine, based in each case on polyamide produced, was obtained as the bottom product of the column. This solution was recycled to the starting salt solution before entry into the evaporator, by means of a pump.

After the polymer melt had emerged from the separator, the product $A_1$ had a very pale natural color and a viscosity number of 48 ml/g (measured as a 0.5% strength solution at 25° C. in 96% strength by weight $H_2SO_4$ according to DIN 53 246). $A_3$ had a viscosity number of 49 ml/g.

The products $A_1$ and $A_2$ had roughly equivalent amounts of terminal carboxyl and amino groups.

In the extruder, the melt was then let down to atmospheric pressure and underwent virtually no further condensation during a residence time of less than 1 minute.

Thereafter, the products were heated batchwise in the solid phase in a stationary heating tube (double-walled glass tube which was heated from the outside with oil to the required temperature and had an internal diameter of 120 mm and a length of 1000 mm and through which 120 l/min of superheated steam flowed) at 200° C. until the viscosity number reached 112 ml/g. The residence time was from 8 to 18 hours. In the course of this heating, if required, a large part of the extractable residual monomers was also extracted from the steam.

Component $A_2$ 2 kg of a monomer mixture corresponding to Example 1 were initially taken with 700 ml of water in a 5 l laboratory autoclave. The mixture was distributed over 5 glass tubes, each having a capacity of 800 ml. The autoclave was heated at 350° C. for 1 hour, the resulting steam pressure being kept constant after reaching 20 bar by releasing excess water. Thereafter, the temperature and pressure were kept constant for a further hour. The autoclave was then cooled to 330° C. and let down to atmospheric pressure. The heater of the autoclave was switched off, room temperature being reached after about 3 hours.

The glass tubes were removed from the autoclave and their contents were coarsely milled. The product obtained was subjected to solid-phase postcondensation at 198° C. under nitrogen until a viscosity number of 115 ml/g was obtained, which took 10 hours.

Components $AV_{1-3}$ 3 kg of a monomer mixture which gave the polymer as stated in Table 1 were initially taken with 2500 ml of water in a 10 l laboratory autoclave. The preparation and working up were carried out as in the case of component $A_2$. After the solid-phase postcondensation under nitrogen at 196° C. (10 hours), the copolyamide had a viscosity number of 114 ml/g.

Component $AV_4$

Aliphatic polyamide obtained from 1,6-diaminohexane and adipic acid and having a K value (according to Fikentscher) of 76, corresponding to a relative viscosity $\eta$rel of 2.95, measured in 1% strength by weight solution in 96% strength by weight sulfuric acid at 25° C.

Component $B_1$

Commercial polyetherimide (eg. Ultem® 1010 from General Electric) was used, said polyetherimide being characterized by a tensile modulus of 3000 N/mm² and being composed of units having the structure

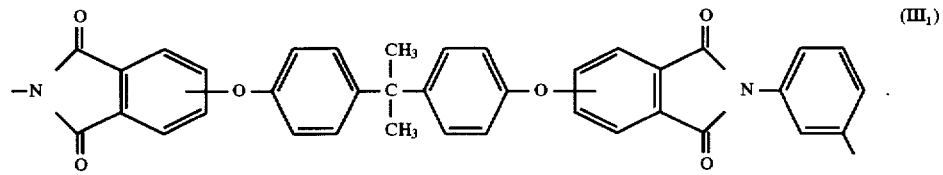

(III₁)

Component C

Condensate of bisphenol A and epichlorohydrin, having a relative viscosity of 1.13, measured in a 0.5% strength by weight solution in dichloromethane at 23° C. (Phenoxy® from Union Carbide Corporation).

Component D

Glass rovings having a thickness of 10 μm and a polyurethane size.

Component E

Ethylene/propylene rubber grafted with 0.7% by weight of maleic anhydride and characterized by a melt flow index of 3 g/10 min, measured at 2.16 kg of 230° C. (commercial product Exxelor VA/1803 from Exxon).

TABLE 1

Composition of the partly aromatic copolyamides used

| Monomers | According to the invention | | | For comparison | | |
|---|---|---|---|---|---|---|
| | $A_1$ | $A_2$ | $A_3$ | $AV_1$ | $AV_2$ | $AV_3$ |
| Hexamethylene-diamine | | | | | | |
| mol-% | 48.1 | 48.1 | 48.0 | 46.2 | 49.7 | 42.7 |
| % by wt. | 39.1 | 39.1 | 35.9 | 36.9 | 40.8 | 33.3 |
| Terephthalic acid | | | | | | |
| mol-% | 32.2 | 32.2 | 40.3 | 29.5 | 32.2 | 32.2 |
| % by wt. | 37.5 | 37.5 | 42.2 | 34.0 | 37.8 | 35.9 |
| Isophthalic acid | | | | | | |
| mol-% | 17.8 | 17.8 | 18.6 | 29.5 | 17.8 | 17.8 |
| % by wt. | 20.6 | 20.6 | 18.6 | 23.6 | 20.9 | 20.9 |
| Bis(4-amino-cyclohexyl)-methane | | | | | | |
| mol-% | 1.9 | 1.9 | — | 3.8 | 0.3 | 7.3 |
| % by wt. | 2.8 | 2.8 | — | 5.5 | 0.45 | 10.9 |
| Bis(4-amino-3-methyl-cyclohexyl)-methane | | | | | | |
| mol-% | — | — | 2 | — | — | — |
| % by wt. | — | — | 3 | — | — | — |
| $\Delta H_{cryst}$ $|J/g|$ | 54 | 52 | 51 | 32 | 36 | 31 |

The individual components in the examples below were mixed in a twin-screw extruder at a melt temperature of from 300° to 340° C. The melt was passed through a water bath and granulated.

The dried granules were processed at from 300° to 340° C. to give tensile test bars, circular disks and standard small bars.

The rigidity (modulus of elasticity) and elongation at break ($\epsilon_R$) of the blends were determined by the tensile test according to DIN 53 455 on dumbbells at 23° C. Furthermore, the rigidity of the samples was determined at 80° C. and 100° C.

The notched impact strength ($a_k$) of the blends was determined according to DIN 53 353 on standard small bars.

The shrinkage was determined by calculating the percentage deviation of injection molded test boxes from the mold dimension (length=120.0 mm).

The composition of the molding materials and the results of the tests are shown in Tables 2 and 3.

TABLE 2

Glass fiber-containing molding materials

| | Example No. | | | | | |
|---|---|---|---|---|---|---|
| | 1 | 2 | 3 | 4 | V1 | V2 |
| Component [% by wt.] | | | | | | |
| $A_1$ | 48 | 25 | — | — | — | — |
| $A_3$ | — | — | 48 | 25 | — | — |
| $AV_1$ | — | — | — | — | 25 | — |
| $AV_4$ | — | — | — | — | — | 25 |
| B | 22 | 45 | 22 | 45 | 45 | 45 |

TABLE 2-continued

Glass fiber-containing molding materials

| | Example No. | | | | | |
|---|---|---|---|---|---|---|
| | 1 | 2 | 3 | 4 | V1 | V2 |
| D | 30 | 30 | 30 | 30 | 30 | 30 |
| E $|N/mm^2|$ at RT | 10500 | 10000 | 10400 | 10100 | 9900 | 9600 |
| $\epsilon_R$ $|%|$ | 3.2 | 2.7 | 3.1 | 2.8 | 2.3 | 1.7 |
| E $|N/mm^2|$ at 100° | 9400 | 9600 | 9400 | 9500 | 8600 | 7300 |
| $a_k$ $|kJ/m^2|$ | 7.2 | 5.4 | 7.0 | 5.3 | 4.5 | 3.2 |
| Shrinkage $|%|$ | 0.4 | 0.5 | 0.4 | 0.5 | 0.5 | 0.7 |

V: Comparative example

TABLE 3

Unreinforced molding materials

| Molding material No. | 5 | 6 | 7 | 8 | V3 | V4 |
|---|---|---|---|---|---|---|
| Component [% by wt.] | | | | | | |
| $A_1$ | 35 | 28 | 25.2 | — | — | — |
| $A_2$ | — | — | — | 25.2 | — | — |
| $AV_2$ | — | — | — | — | 25.2 | — |
| $AV_3$ | — | — | — | — | — | 25.2 |
| B | 65 | 65 | 58.4 | 58.4 | 58.4 | 58.4 |
| C | — | — | 10 | 10 | 10 | 10 |
| E | — | 7 | 6.4 | 6.4 | 6.4 | 6.4 |
| E $|N/mm^2|$ at RT | 3100 | 2900 | 2800 | 2750 | 2700 | 2650 |
| $\epsilon_R$ $|%|$ | 8.2 | 23 | 66 | 59 | 24 | 26 |
| E $|N/mm^2|$ at 80° C. | 2600 | 2400 | 2300 | 2300 | 1900 | 1900 |
| $W_S$ $|Nm|$ | 0.1 | 32 | 78 | 69 | 16 | 23 |

V: Comparative example

We claim:

1. A thermoplastic molding composition containing

A) from 1 to 99% by weight of a partly aromatic copolyamide composed of
  $a_1$) from 30 to 44 mol % of units which are derived from terephthalic acid,
  $a_2$) from 6 to 25 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms, the molar percentages of components $a_1$) to $a_4$) together giving 100%, B) from 1 to 99% by weight of a polyetherimide, C) from 0 to 30% by weight of a polymeric component having OH groups, D) from 0 to 60% by weight of fibrous or particulate fillers or mixtures thereof, E) from 0 to 40% by weight of rubber impact modifiers and F) from 0 to 40% by weight of conventional additives and processing assistants.

2. A thermoplastic molding composition as defined in claim 1, in which the units $a_4$ of the partly aromatic copolyamides A are derived from bis(4-aminocyclohexyl)methane or bis(4-amino-3-methylcyclohexyl)methane or a mixture thereof.

3. A thermoplastic molding composition as defined in claim 1, in which from 2 to 20% by weight of component C are present.

4. A thermoplastic molding composition as defined in claim 1, containing, as component C, a polycondensate of aliphatic or aromatic polyhydric alcohols with epihalohydrins.

5. A fiber prepared from a thermoplastic molding composition as defined in claim 1.

6. A film prepared from a thermoplastic molding composition as defined in claim 1.

7. A molding prepared from a thermoplastic molding composition as defined in claim 1.

* * * * *